US009098630B2

(12) United States Patent
Funke et al.

(10) Patent No.: US 9,098,630 B2
(45) Date of Patent: Aug. 4, 2015

(54) DATA SELECTION

(71) Applicant: International Business Machines Corporation, Armonk, NY (US)

(72) Inventors: Florian Funke, Tuebingen (DE); Peter Gerstl, Holzgerlingen (DE); Daniel S. Haischt, Herrenberg/Kayh (DE)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 13/792,731

(22) Filed: Mar. 11, 2013

(65) Prior Publication Data
US 2014/0019941 A1 Jan. 16, 2014

(30) Foreign Application Priority Data
Jul. 10, 2012 (GB) .................................. 1212231.3

(51) Int. Cl.
G06F 9/44 (2006.01)
G06F 11/36 (2006.01)
G06F 3/048 (2013.01)
G06F 3/0489 (2013.01)
G06F 3/0484 (2013.01)
G06Q 10/06 (2012.01)

(52) U.S. Cl.
CPC ............ G06F 11/3672 (2013.01); G06F 3/048 (2013.01); G06F 3/0489 (2013.01); G06F 3/04842 (2013.01); G06Q 10/06 (2013.01)

(58) Field of Classification Search
CPC ............ G06F 17/30; G06F 17/30477; G06F 17/30424; G06F 17/30483; G06F 9/44; G06F 11/3068; G06F 17/30917; G06F 11/3676; G06F 17/30306; G06F 17/30545; G06F 17/3056
See application file for complete search history.

(56) References Cited

U.S. PATENT DOCUMENTS

| 5,623,499 | A | 4/1997 | Ko et al. | |
| 7,363,616 | B2 | 4/2008 | Kalyanaraman | |
| 7,464,297 | B2 | 12/2008 | Potter, IV et al. | |
| 7,480,898 | B2 * | 1/2009 | Batten et al. ................. | 717/124 |
| 7,640,470 | B2 | 12/2009 | Lammel et al. | |
| 7,664,989 | B2 | 2/2010 | Joshi et al. | |

(Continued)

FOREIGN PATENT DOCUMENTS

| CN | 101887564 A | 11/2010 |
| CN | 102043720 A | 1/2011 |

(Continued)

OTHER PUBLICATIONS

Gregory M. Kapfhammer et al.; A family of test adequacy criteria for database-driven applications; 2003 ACM; pp. 98-107; <http://dl.acm.org/citation.cfm?id=940086>.*

(Continued)

*Primary Examiner* — Thuy Dao
*Assistant Examiner* — Cuong V Luu
(74) *Attorney, Agent, or Firm* — Cantor Colburn LLP; Terry Carroll

(57) ABSTRACT

In an exemplary embodiment of this disclosure, a data selection method may include receiving first data representative of program code having a plurality of database operations. Second data is generated and is representative of a sequence of operations encounterable in an execution of the program code, where the sequence of operations includes at least one of the database operations. A third data is selected from a database, by using the second data.

9 Claims, 5 Drawing Sheets

(56) References Cited

U.S. PATENT DOCUMENTS

| | | | |
|---|---|---|---|
| 8,332,824 B2* | 12/2012 | Shemenzon et al. | 717/127 |
| 2002/0099521 A1* | 7/2002 | Yang et al. | 702/186 |
| 2003/0005087 A1* | 1/2003 | Bernhardt et al. | 709/220 |
| 2005/0131878 A1* | 6/2005 | Chen et al. | 707/3 |
| 2006/0010426 A1* | 1/2006 | Lewis et al. | 717/124 |
| 2006/0224777 A1 | 10/2006 | Sand et al. | |
| 2008/0065941 A1* | 3/2008 | Lammel et al. | 714/746 |
| 2008/0086660 A1* | 4/2008 | Wefers | 714/37 |
| 2008/0270983 A1* | 10/2008 | Ahadian et al. | 717/113 |
| 2008/0270989 A1* | 10/2008 | Ahadian et al. | 717/126 |
| 2009/0037893 A1* | 2/2009 | Brodsky et al. | 717/154 |
| 2009/0182756 A1* | 7/2009 | Kang et al. | 707/102 |
| 2009/0287729 A1 | 11/2009 | Chen et al. | |
| 2010/0257154 A1* | 10/2010 | Pendap et al. | 707/718 |
| 2011/0208469 A1 | 8/2011 | Sheye | |
| 2015/0032761 A1* | 1/2015 | Pasternack | 707/748 |

FOREIGN PATENT DOCUMENTS

| | | | |
|---|---|---|---|
| EP | 1650663 A2 | 4/2006 | |
| JP | 59-49211 | 9/1996 | |
| JP | 2010267024 A | 11/2010 | |
| JP | 2011204069 A | 10/2011 | |
| WO | 2011116471 A1 | 9/2011 | |

OTHER PUBLICATIONS

David Willmor et al.; A safe regression test selection technique for database-driven applications; 2005 IEEE; 10 pages; <http://ieeexplore.ieee.org/stamp/stamp.jsp?tp=&arnumber=1510137>.*

Qing Xie et al.; Designing and comparing automated test oracles for GUI-based software applications; 2007 ACM; 36 pages; <http://dl.acm.org/citation.cfm?id=1189752>.*

D. Richard Kuhn et al.; Software Fault Interactions and Implications for Software Testing; 2004 IEEE; pp. 428-421; <http://ieeexplore.ieee.org/stamp/stamp.jsp?tp=&arnumber=1321063>.*

Michael Emmi et al.; Dynamic test input generation for database applications; 2007 ISSTA; pp. 151-162; <http://dl.acm.org/citation.cfm?id=1273484>.*

Klaus R. Dittrich et al.; DAMOKLES—A Database System for Software Engineering Environments; 1986 Springer; pp. 353-371; <http://link.springer.com/chapter/10.1007/3-540-17189-4_107>.*

Agarwal et al., "Towards Software Test Data Generation using Discrete Quantum Particle Swarm Optimization", Proceeding ISEC '10 Proceedings of the 3rd India software engineering conference; Feb. 25-27, 2010, Mysore, India; pp. 65-68.

English Translation of JP2010267024 published Nov. 25, 2010, 19 pages.

English Translation of JP2011204069A; published Oct. 13, 2011; 20 pages.

Lammel et al., "Controllable combinatorial coverage in grammar-based testing", Micrsoft Corporation, Microsoft Research, [Undated] 18 pages, TestCom 2006, Lecture Notes in Computer Science vol. 3964, 2006, pp. 19-38.

Nayak et al., "Automatic Test Data Generation for Data Flow Testing Using Particle Swarm Optimization", Communications in Computer and Information Science, Contemporary Computing, Third International Conference, IC3, 2010, Noida, India, Aug. 9-11, 2010 Proceedings, Part II; 15 pages.

Rapps et al., "Data Flow Analysis Techniques for Test Data Selection", 1982 IEEE, pp. 272-278.

Suarez-Cabal et al., "Populating Test Databases for Testing SQL Queries", IEEE Latin America Transactions, vol. 8, No. 2, Apr. 2010, pp. 164-171.

UK Search Report prepared by Intellectual Property Office for Application No. GB1212231.3; Date of Search Oct. 29, 2012, 4 pages.

* cited by examiner

DATA SELECTION

PRIORITY

This application claims priority to United Kingdom Patent Application No. GB 1212231.3, filed 10 Jul. 2012, and all the benefits accruing therefrom under 35 U.S.C. §119, the contents of which in its entirety are herein incorporated by reference.

BACKGROUND

The present disclosure relates to selecting data representative of data stored in a database. In particular, the disclosure relates to selecting such data for the purpose of testing software.

Software is frequently modified for the sake of improvement, e.g., for squashing bugs and for providing better fulfillment of users' demands. To ensure that the modified software operates as intended, it is known to test the modified software, e.g., in a (virtualized) testing system that attempts to simulate, as fully and as realistically as possible, deployment scenarios that the software can be expected to encounter in real life.

SUMMARY

In one embodiment, a data selection method comprises receiving first data representative of program code that comprises a plurality of database operations. Second data is generated and is representative of a sequence of operations encounterable in an execution of the program code, where the sequence of operations includes at least one of the database operations. A third data is selected from a database, by using the second data.

In another embodiment, a data selection system comprises a data receiver, a data generator, and a data selector. The data receiver may be configured to receive first data representative of program code comprising a plurality of database operations. The data generator may be configured to generate second data representative of a sequence of operations encounterable in an execution of said program code. The sequence of operations may include at least one of the database operations. The data selector may be configured to select third data from a database using the second data.

In yet another embodiment, a computer program product comprises a computer readable storage medium having computer readable program code embodied thereon. The computer readable program code is executable by a processor to perform a method. That method comprises receiving first data representative of program code comprising a plurality of database operations. Second data may be generated representative of a sequence of operations encounterable in an execution of the program code, where the sequence of operations comprises at least one of the database operations. Third data may be selected from a database using the second data.

Additional features and advantages are realized through the techniques of the present disclosure. Other embodiments and aspects of the disclosure are described in detail herein and are considered part of the disclosure. For a better understanding of the various embodiments, along with their advantages and features, refer to the description and to the drawings.

DETAILED DESCRIPTION

Figure 2:
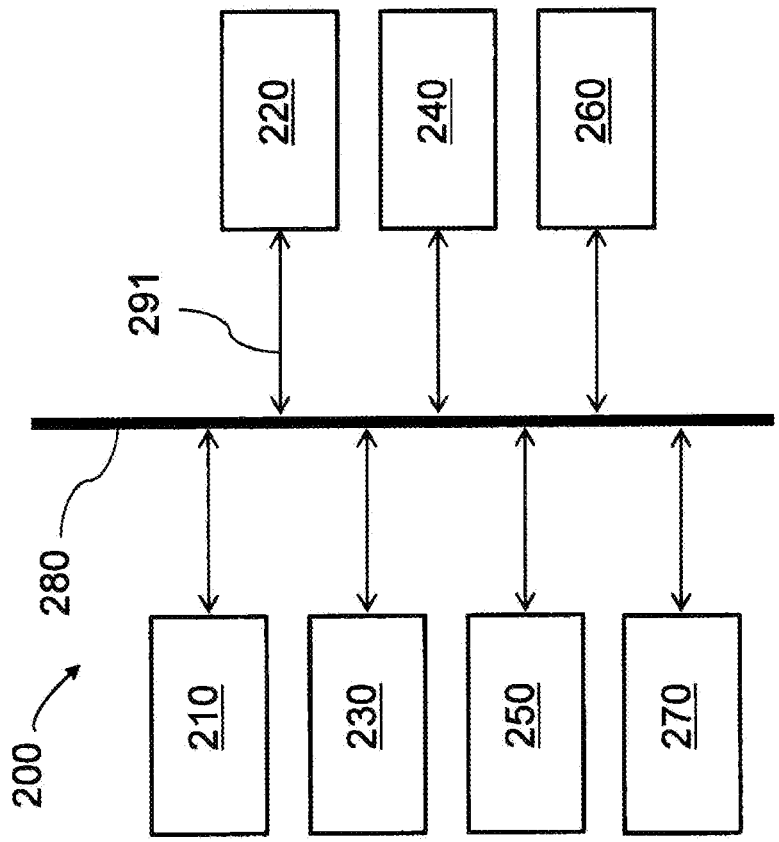
FIG. 2 shows a data selection system in accordance with an embodiment of the present disclosure.

The present disclosure relates to a data selection method that performs analysis of operations, in particular database operations, that are encountered along the respective execution paths through a piece of software. Having knowledge of such database operations, the method may select a subset of data from a database that is representative, such as with respect to testing the software, of a much larger collection of data in that database. The method may furthermore assess the range of values of various parameters encountered along the respective execution paths through the software. This furthers the method's ability to select a subset of data from a database that is representative of a much larger collection of data in that database. Testing of the software may then be carried out using such a selected subset of data as operands for the database operations.

The method may use knowledge of the structure of relationships in the database in its selection of a subset of data, e.g., to better understand possible interrelationships between the operands of the database operations.

In one aspect, as touched upon above, the present disclosure relates to a data selection method, e.g., to a method of selecting a subset of data from a collection of data in a database.

The method may comprise receiving (first) data representative of program code comprising database operations. The (first) data may comprise a representation of the program code in one or more programming languages such as C++, ADA, Java, C or Pascal. As such, the (first) data may comprise an ASCII or Unicode representation of the characters constituting the program code in the respective programming language(s). Similarly, the (first) data may comprise an executable representation of the program code, e.g., a binary or hexadecimal representation of executable program code. The program code may comprise one or more database operations, i.e., operations that read or write data from or to a database. The database operations may comprise JDBC (Java Database Connectivity) statements, SQL code, commands of a persistency framework, etc.

The method may comprise generating (second) data representative of a sequence of operations, e.g., a sequence of operations of the program code represented by the first data. While the term "sequence of operations" is used here and in the following in the singular, the (second) data may be representative of more than one sequence of operations, the term "sequence of operations" thus denoting one or more subset(s) of the sequences of operations represented by the (second) data.

The (second) data may represent the sequence of operations in the form of a set of operations comprising each of the operations belonging to the sequence along with metadata representative of the order of the operations in the sequence. The (second) data may comprise a representation of the sequence of operations and/or one or more of the respective operations in one or more programming languages, such as C++, ADA, Java, C or Pascal. As such, the (second) data may comprise an ASCII or Unicode representation of the characters constituting the sequence of operations and/or of the respective operations in the respective programming language(s). Similarly, the (second) data may comprise an executable representation of the sequence of operations and/or one or more of the respective operations, e.g., a binary or hexadecimal representation of the sequence of operations and/or of the respective operations.

The sequence of operations may comprise at least one database operation, e.g., at least one of the database operations comprised by the program code represented by the first data.

The sequence of operations may be a sequence of operations encounterable in an execution of the program code represented by the first data. For example, the sequence of operations may be the entire sequence of (consecutive) operations encountered along one of the various paths of execution, beginning at any of one or more given entry points (e.g., at a main entry point into the program code) and concluding at any of one or more given location(s) in the program code (e.g., at a given exit point or at an execution termination operation in the program code). As such, generating the (second) data representative of a sequence of operations may comprise determining at least one execution path through at least part of the program code. Similarly, generating the (second) data representative of a sequence of operations may comprise establishing a control flow graph for at least a part of the program code. The control flow graph may comprise nodes and directed edges. For example, each node may represent a sequence of operations that is executed without a branch or jump, and each directed edge may represent a respective, possibly conditional, branch or jump from a final operation in a sequence of operations (represented by a node) to a first operation in a sequence of operations (represented by a node).

The sequence of operations may, but need not, be a sequence of consecutive operations. For example, if the sequence of operations is a sequence of operations encounterable in an execution of the program code, the sequence of operations may, but need not, specify each operation encountered in the execution of the program code between the first operation of the sequence and the last operation of the sequence. Instead, the sequence of operations may specify a set, such as an ordered set, of operations encountered in the execution of the program code between the first operation of the sequence and the last operation of the sequence. The sequencing inherent to the sequence of operations may specify an order of the operations belonging to the set, i.e., specify, for each of the operations belonging to the set, another operation of the set that precedes or succeeds that operation.

The method may comprise selecting (third) data using the second data.

The selecting may comprise determining a set of operands operated on by the sequence of operations. The selecting may comprise selecting a subset of the determined set of operands as at least part of the (third) data. The method may comprise processing the determined set of operands to contain only operands that are mutually distinct. The method may comprise randomly selecting, randomly or accordingly to a predetermined formula, less than 20%, less than 10%, less than 5% or less than 2% of the operands in the determined set of operands as the subset, i.e., as at least part of the (third) data. Selecting the (third) data may comprise selecting a subset of the determined set of operands, which subset is representative, e.g., in a numerical or statistical manner, of the determined set of operands as a whole. For example, for a set of operands containing the numbers 1 to 100, the numbers 1, 25, 50, 75 and 100 may be selected as the representative subset, i.e., as at least a part of the (third) data. Similarly, if an operation in the sequence of operations operates on a field of a database table containing 2000 records, the representative subset may be obtained by randomly selecting 50 of those 2000 records and deeming the respective fields of those 50 records in the database as constituting the representative subset. As such, the method may comprise selecting (third) data from a database using the second data.

The method may comprise establishing the value of one or more parameters used in the operations of the sequence of operations. For example, the method may comprise establishing, e.g., by receiving a user input, an expected or suitable value for a parameter at an onset of the sequence of operations. Similarly, the method may comprise establishing the value of the parameter at the onset of a sequence of operations by simulating execution of preceding operations, e.g., operations encountered along an execution path between a main entry point into the program code and the first operation of the sequence of operations, or operations encountered along an execution path between an operation that initializes the parameter and the first operation of the sequence of operations. The parameter may be used as an operand, i.e., may be an operand of one or more operations belonging to the sequence of operations. As such, the parameter may be a parameter, e.g., a program variable, modified or referenced by one or more operations belonging to the sequence of operations.

The method may comprise establishing a collection of one or more values of a parameter encounterable in an execution of the sequence of operations. The method may comprise processing the established collection of values to contain only values that are mutually distinct. In other words, the collection of values may be a collection of mutually distinct values. The parameter may be a parameter as described above, e.g., a parameter used in the sequence of operations or an operand of an operation belonging to the sequence of operations. The collection of values of the parameter may include a value entered by a user. For example, if the sequence of operations increments the value of the parameter 10 times by a value of 1 and the parameter was established, e.g., by receiving a user input, as having a value of 0 at the onset of the sequence of operations, then the collection of values may contain the numbers 0 and 10; the collection of all values may contain the numbers 0 through 10. Similarly, if the parameter is representative of an index to a database record (as may be determined by analysis of the sequence of operations, in particular as regards the role of the parameter in the sequence of operations) and is limited by the sequence of operations to an integer smaller than the total number of records in the database, then the collection of values may be deemed as containing all integers smaller than the total number of records in the database. As such, the method may comprise determining the role of one or more parameters, or operands, in the sequence of operations, which determining may comprise analyzing the sequence of operations.

The selecting of (third) data may use the collection of values. For example, a representative subset of the collection of values may be selected as at least part of the (third) data or for obtaining at least part of the (third) data, e.g., as touched upon above. For example, if the collection of values contains the numbers 0 to 100, the numbers 0, 20, 40, 60, 80 and 100 may be selected as the representative subset, i.e., as at least part of the (third) data. Similarly, if the collection of values is for a parameter representative of an index to a database record, then a set of records from the database having indices randomly selected from the collection of values may constitute at least part of the (third) data. As such, the method may comprise randomly selecting a subset, such as a mutually distinct subset, of the collection of values, e.g., a subset containing less than 20%, less than 10%, less than 5% or less than 2% of the number of values in the collection of values.

The method may comprise establishing an entry point into the program code, e.g., by receiving a user input indicative of the entry point or by determining a main entry point into the program code. Such a main entry point may be, for example, the first line of code in the program or the first line of code in an outermost function of a plurality of nested functions constituting the program. The entry point need not be the main entry point. For example, the entry point may be a first line of code in a commonly called function of the program.

The method may comprise establishing an exit point from the program code, e.g., by receiving a user input indicative of one or more exit points or by determining one or more natural exit points from the program code. Such a natural exit point may be the last line of code in the program or an execution termination operation in the program code. The exit point need not be a natural exit point. For example, the exit point may be a last line of code in the function containing the entry point or an operation stipulating exit from the function containing the entry point.

The method may comprise generating (fourth) data representative of each sequence of operations encounterable in execution of the program code starting from the established entry point, e.g., encounterable in execution of the program code starting from the established entry point and concluding at an established exit point. In other words, the method may comprise determining every sequence of operations that can be encountered, up until one or more established exit points, when starting execution of the program at an established entry point, taking into consideration the various possible permutations e.g., as allowed by conditional branch operations.

The generating of second data may comprise selecting the second data from the aforementioned fourth data. For example, generating the second data may comprise selecting, as at least part of the second data, data representative of at least part of one or more of the sequences of operations represented by the fourth data. For example, generating the second data may comprise selecting, as at least part of the second data, data representative of at least part of the most frequently executed sequence of operations of the sequences of operations represented by the fourth data.

As touched upon above, the method may comprise establishing the value of a parameter used in an operation in the sequence of operations. As such, the method may comprise establishing the value of a parameter used in an operation in one or more of the sequences of operations represented by the fourth data. The method may comprise establishing the value of the parameter at the entry point with respect to which the fourth data was generated. As discussed in detail above, establishing the value of the parameter at the entry point may be carried out, e.g., by receiving a user input or by simulating execution of operations preceding the entry point. The established value of the parameter may be used in a manner described above, e.g., to establish a collection of values.

As touched upon above, the method may comprise establishing a collection of (one or more or all) values of a parameter encounterable in an execution of the sequence of operations. As such, the method may comprise establishing a collection of (one or more or all) values of a parameter encounterable in an execution of one or more of the sequences of operations represented by the fourth data. The established collection of values may be used in a manner described above, e.g., to select the (third) data.

The method may comprise receiving (fifth) data representative of a structure of data of the database, a relationship between data of the database, or a combination of both. For example, the database may comprise data representative of a plurality of records, each record having one or more record items. Accordingly, the (fifth) data may be representative of one or more data types of one or more or each of the record items. Similarly, the (fifth) data may be representative of a structure of one or more or each of the records. Furthermore, the database may be a relational database. As such, the (fifth) data may be representative of a relationship between data in the database.

The above-mentioned selecting of (third) data may use the (fifth) data. For example, the data type of an operand of a database operation may be used to ensure that a subset of data is selected that is representative of the data in the database for that operand. Similarly, a relationship of an operand of a database operation to operands of other database operations may likewise be used to ensure that a representative subset of data is selected.

The method may comprise executing the sequence of operations using at least part of the selected (third) data as an operand, e.g., as an operand for at least one database operation, such as an operation belonging to the sequence of operations. In particular, in cases where selecting of (third) data comprises selecting data from a database, the method may execute the sequence of operations using no more data of the database as an operand (for the database operations belonging to the sequence of operations) than the selected (third) data. Executing the sequence of operations may comprise executing a portion of the program code containing one or more or all of the operations belonging to the sequence of operations.

As is apparent from the above description, the selected (third) data may comprise various portions of data. One or more of the portions of data may comprise data selected using a collection of values of a respective parameter that is used as an operand in a respective set of operations belonging to the sequence of operations. As such, one or more portions of the (third) data may each be deemed as having a corresponding parameter or a corresponding set of operations (in the sequence of operations). Accordingly, executing the sequence of operations using at least part of the selected (third) data as an operand may be effected such that the individual portions of the selected (third) data are used in the respective, corresponding operations.

While the teachings of the present disclosure have been discussed above mainly in the form of a method, the teachings may be embodied in the form of a system (e.g., a data selection system) or a computer program product, as will be appreciated by a person skilled in the art.

The system may be configured and adapted to effect the actions described above with respect to the disclosed method. For example, the system may comprise a processor that effects the actions described above with respect to the disclosed method.

The system may comprise a data receiver that receives (first) data representative of program code, e.g., as described above.

The system may comprise a data generator that generates (second) data representative of a sequence of operations, e.g., as described hereinabove.

The system may comprise a data selector that selects (third) data, e.g., as described above.

The system may comprise a value establisher that establishes a value of a parameter, e.g., as described above.

The system may comprise a collection establisher that establishes a collection of values, e.g., as described above.

The system may comprise an entry point establisher that establishes an entry point into program code, e.g., as described above.

The system may comprise an operation sequence executor that executes the sequence of operations, e.g., as described above, for example using the (third) data.

The system may comprise a user input receiver that receives user inputs as discussed above.

The system components mentioned above may communicate with one another as needed to perform their various operations. As such, the system may comprise one or more communication busses or links interconnecting the respective components.

Figure 1:
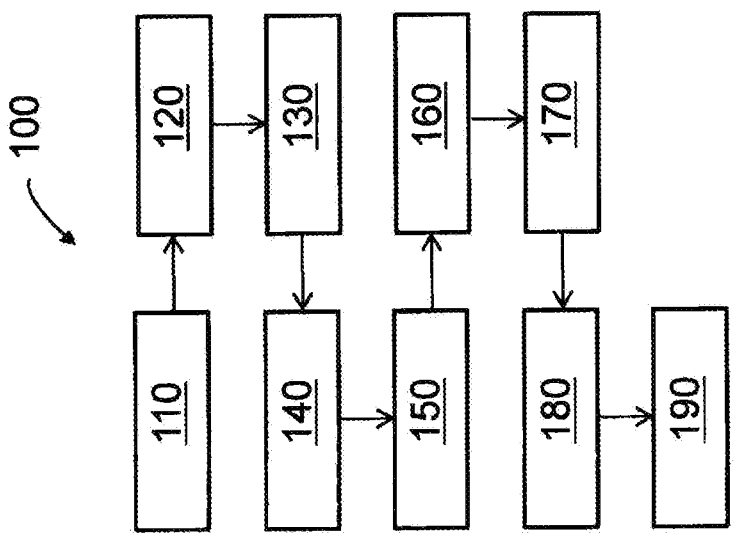
FIG. 1 is a flow diagram of a data selection method in accordance with an embodiment of the present disclosure.

FIG. 1 shows a flow diagram 100 of a data selection method in accordance with an embodiment of the present disclosure.

In the illustrated embodiment, flow diagram 100 comprises a block 110 for receiving (first) data representative of program code, an optional block 120 for receiving (fifth) data representative of a structure of data of the database or a relationship between various data of the database, an optional block 130 for establishing an entry point, an optional block 140 for generating (fourth) data representative of each sequence of operations encounterable in execution of the program code starting from the entry point, a block 150 for generating (second) data representative of a sequence of operations, an optional block 160 for establishing a value of the parameter, an optional block 170 for establishing a collection of values of the parameter, a block 180 for selecting (third) data from a database using the (second) data and an optional block 190 for executing the sequence of operations using the selected (third) data.

FIG. 2 shows an embodiment of a data selection system 200 in accordance with an embodiment of the present disclosure.

In the illustrated embodiment, data selection system 200 comprises a data receiver 210 that receives (first) data representative of program code, a data generator 220 that generates (second) data representative of a sequence of operations, a data selector 230 that selects (third) data, an optional value establisher 240 that establishes a value of a parameter, an optional collection establisher 250 that establishes a collection of values, an optional entry point establisher 260 that establishes an entry point into the program code, an optional operation sequence executor 270 that executes the sequence of operations, and a communication bus 280 comprising a plurality of communication links 281. (For the sake of legibility, only one of the communication links bears a reference sign.) Communication bus 280 and the communication links 281 may communicatively interconnect the aforementioned components 210-270.

Further embodiments of the data selection methods and data selection systems will be discussed below with reference to FIGS. 3A to 3D.

Figure 3A:
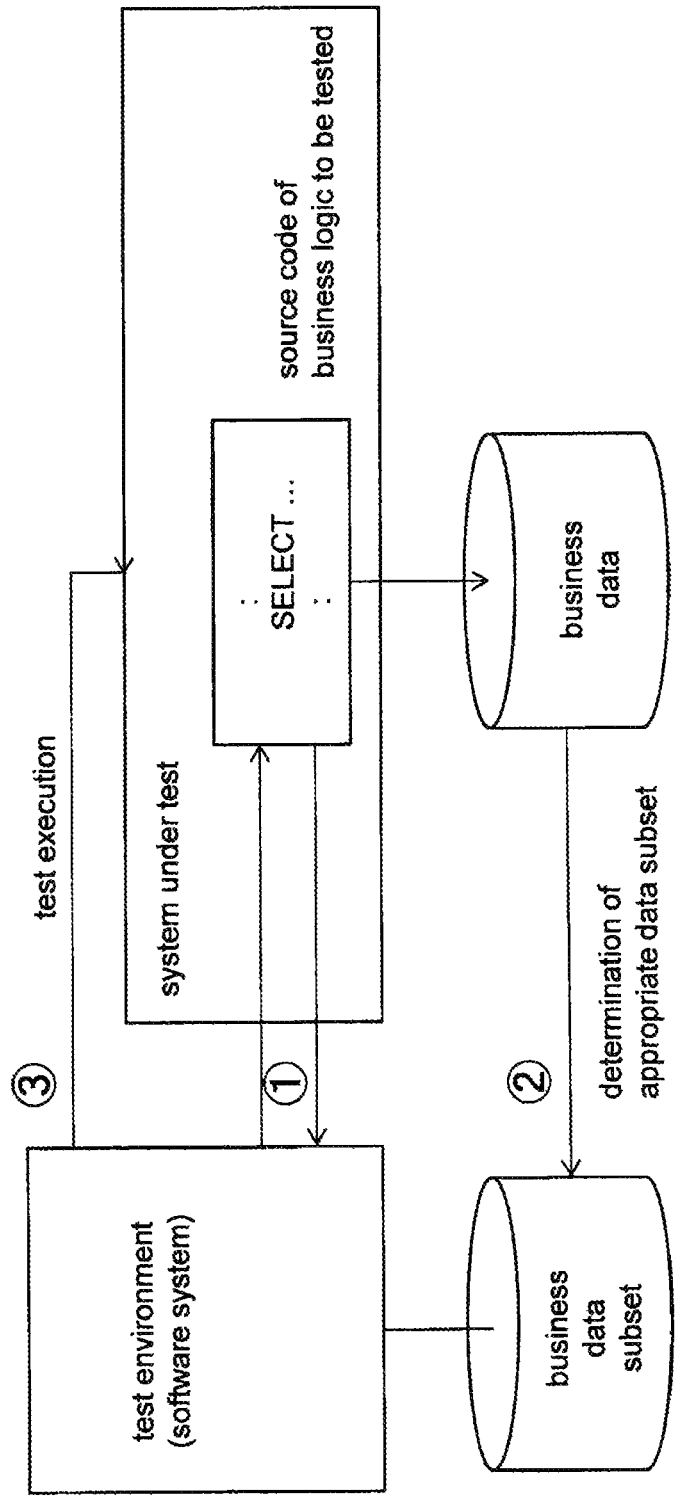
FIG. 3A shows a test system employing a data selection system in accordance with an embodiment of the present disclosure.

FIG. 3A shows a test system employing a data selection system in accordance with an embodiment of the present disclosure, e.g., as described above.

The test system shown in FIG. 3 may allow a test team to select an appropriate subset based on knowledge about the logic to be tested, e.g., where the source code implementing this logic is available and accessible to the test system. This is the case for a) custom dedicated business applications where the owner has full access to its source code, b) software products which can be extended with custom built logic based on public APIs, and c) software products that expose parts of their logic as source code (e.g., as in the case of the SAP application suite where large portions of the business logic are available as ABAP source code).

The test system may analyze the specified paths through the application's business logic using algorithms originating from the domain of static code analysis techniques and may determine both the scope of data that is used within the business logic, i.e., a subset of meta data model of the underlying business data, as well as a representative subset of data to be used for testing this business logic.

The test system may analyze the source code of the business logic to be tested starting at a particular code entry point (e.g., a function in C or Java or an ABAP routine) and analyze data access operations (such as, for example, SQL select statements). As a result of this analysis, the test system may determine combinations of data records that match the expected outcome of these operations.

The logic to be tested may be available as source code where access to persistently stored data is performed by operations within the source code such as JDBC statements, SQL code, or commands of a persistency framework. The software system under test may provide a data source of some sort (e.g., an SQL connection) linking the system to a concrete data store.

The system under test may be inspected and a resulting meta data model may be generated to provide as a basis for a representative subset of test data (Blocks 1 & 2 in FIG. 3A) to test a given software system (Block 3 in FIG. 3A).

Figure 3B:
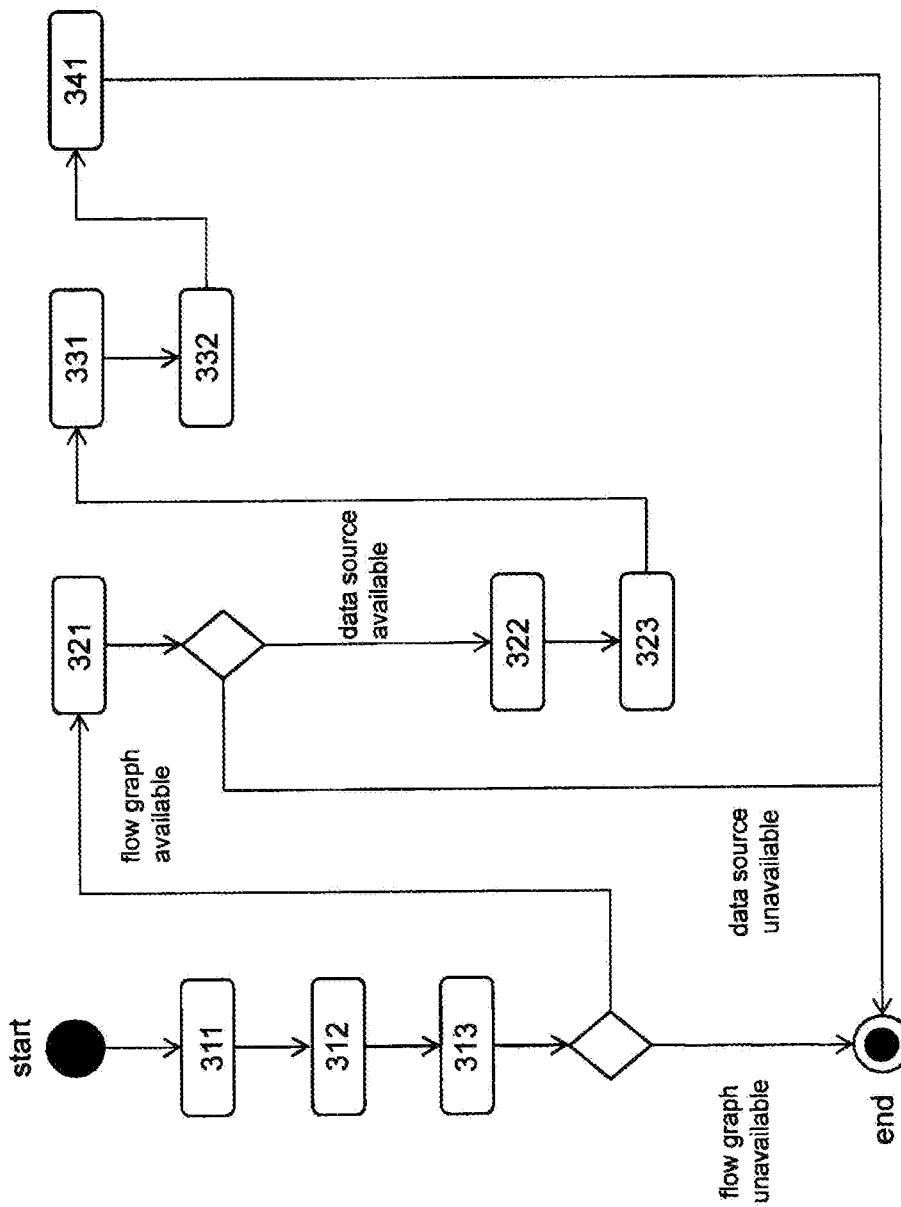
FIG. 3B is a flow diagram of an exemplary algorithm employed by the test system of FIG. 3A.

The test system may infer the aforementioned information by creating, e.g., in accordance with the flow graph shown in FIG. 3B, a control and data flow graph through static analysis of both the business logic and the persistently stored data together.

The example workflow shown in FIG. 3B comprises a block 311 for providing an initial entry point including one or more parameters, a block 312 for inspecting possible paths through the program, a block 313 for traversing conditional branches, a block 321 for determining a data source, a block 322 for extracting SQL code from the program, a block 323 for instantiating SQL statement paths, a block 331 for determining SQL statements per conditional branch, a block 332 for completing SQL statements using input parameters and a block 341 for creating DDL/DML statements for SQL statement paths. The part of the workflow between start and end through blocks 311-313 may be designated as static analysis. The part of the workflow between blocks 321 and 323 may be designated as SQL statement extraction. The part of the workflow comprising blocks 331 and 332 may be designated as SQL statement inspection. The part of the workflow comprising block 341 may be designated as DML/DDL statement generation.

The test system may be provided with the following input parameters:
1. The source code of the business logic to be tested.
2. An entry point (e.g., a Java/C/C++ main method) and optionally a set of parameter values for this entry point (if relevant for the test).
3. A set of one or more data-sources to work with, e.g., a database connection.

The test system may establish or calculate the following:
1. One or more, or all, relevant paths through the source code.
2. A subset of the meta model, e.g., a subset of the tables from the relational data source specified.

3. The proposed system may create a set of (SQL) queries that extract representative data for the test to be executed.

The algorithm employed by the test system may be summarized as follows:

source code analysis and path extraction;
extraction of statements within the path;
analysis of statements in the context of the given data source; and
generate SQL statements, such as DDL or DML SQL statements, based on the previously analyzed paths.

The following non-exclusive list contains examples of programming languages and persistence frameworks to which the disclosed techniques may be applied:

ODBC/respective an SQL dialect to be used
ABAP/respective OpenSQL
Java 2 EE/respective Enterprise JavaBeansQuery Language
JPA/respective Java Persistence Query Language The test system may identify the relevant data access operations within the source code of the business logic and determine the values or value ranges of variables within these data access operations using static source code analysis. Based on these values or value ranges, the test system may compute a model of the data to be used for testing. Since the source code analysis provides values or value ranges for variables within these statements (such as for host variables in SQL), the range of data may, in many cases, be computed for static and dynamic data access operations. Cases where dynamic data access operations are based on values beyond the scope of the business logic under test, where a precise determination of values is not possible, may be identified and highlighted such that a user can provide the missing values manually.

Figure 3C:
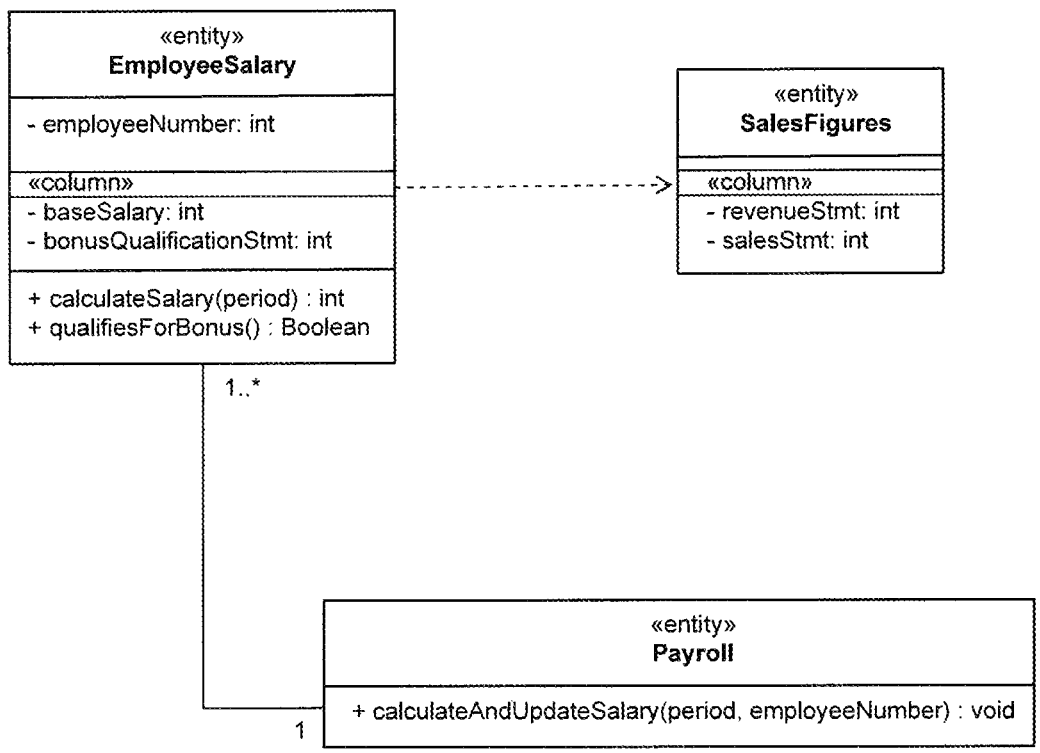
FIG. 3C shows an exemplary structure of a database accessed by the test system of FIG. 3A.

The Java code reproduced below is used here as an example to illustrate how the test system shown in FIG. 3A may operate. The code comprises statements that access tables of a persistent database that contains business data. The syntax and semantics of these statements may be defined by the JDBC specification. FIG. 3C shows an exemplary structure of a database accessed by the test system of FIG. 3A, i.e., a database with which the Java code interacts.

```
public class Payroll {
    /* define a datasource to be able to access a data store */
    static java.sql.Connection con =
        java.sql.DriverManager.getConnection("jdbc:myDriver:carl",
"myLogin","myPassword");
    class SalesFigures {
        /* statements holding some query language expressions to be
analyzed */
        java.sql.PreparedStatement revenueStmt;
        java.sql.PreparedStatement salesStmt;
        SalesFigures(String period) throws java.sql.SQLException {
            this.revenueStmt =
                con.prepareStatement("SELECT revenue FROM
sales WHERE period = '" + period + "'");
            this.salesStmt =
                con.prepareStatement("SELECT overall_sales
FROM sales WHERE period = '" + period + "'");
        }
        /* some arbitrary business logic */
        int revenue( ) throws java.sql.SQLException {
            int revenue = 0;
            java.sql.ResultSet rs = revenueStmt.executeQuery( );
            if (rs.next( )) revenue = rs.getInt("revenue");
            return revenue;
        }
        /* some arbitrary business logic */
        int sales( ) throws java.sql.SQLException {
            int sales = 0;
            java.sql.ResultSet rs = salesStmt.executeQuery( );
            if (rs.next( )) sales = rs.getInt("overall_sales");
            return sales;
        }
    }
    class EmployeeSalary {
        int employeeNumber;
        PreparedStatement bonusQualificationStmt;
        EmployeeSalary(int employeeNumber) throws SQLException {
            this.employeeNumber = employeeNumber;
            this.bonusQualificationStmt = con.prepareStatement("SELECT
employees.bonus_qualifier FROM employees, sales_by_org " +
                "WHERE employees.empno = ? AND " +
                "employees.org = sales_by_org.org AND " +
                "sales_by_org.profit > 1000");
            this.bonusQualificationStmt.setInt(1, employeeNumber);
        }
        int baseSalary( ) throws SQLException {
            int baseSalary = 0;
            Statement stmt = con.createStatement( );
            ResultSet rs = stmt.executeQuery("SELECT base_salary FROM
employees
            WHERE EMPNO = " + employeeNumber);
            if (rs.next( )) baseSalary = rs.getInt("base_salary");
            return baseSalary;
        }
        boolean qualifiesForBonus( ) throws SQLException{
            String bonusQualifier = null;
            ResultSet rs = bonusQualificationStmt.executeQuery( );
            if (rs.next( )) bonusQualifier = rs.getString("bonus_qualifier");
            return (bonusQualifier != null && bonusQualifier.equals("1A"));
        }
        int calculateSalary(String period) throws SQLException {
            String wageType = null;
            Statement stmt = con. createStatement( );
            ResultSet rs = stmt.executeQuery("SELECT wage_type FROM
employees
            WHERE EMPNO = " + employeeNumber);
            if (rs.next( )) wageType = rs.getString("wage_type");
            int salary = baseSalary( );
                            /* Execution path (A) */
            if (wageType == null) return salary;
                            /* Execution path (B) */
            if (wageType.equals("M")) {
                salary += salary / 10;
            }
                            /* Execution path (C) */
            else if (wageType.equals("S") && qualifiesForBonus( )) {
                /* compute salary by retrieving sales figures from a data store */
                SalesFigures sf = new SalesFigures(period);
                salary += sf.revenue( ) / 1000;
            }
            return salary;
        }
    }
    /* some arbitrary business logic */
    void calculateAndUpdateSalary(int employeeNumber,
        String period) throws java.sql.SQLException {
        java.sql.PreparedStatement updateSalaryStmt =
            con.prepareStatement("UPDATE employees SET salary =
? WHERE empno = ?");
        EmployeeSalary es = new EmployeeSalary(employeeNumber);
        int salary = es.calculateSalary(period);
        updateSalaryStmt.setInt(1, salary);
        updateSalaryStmt.setInt(2, employeeNumber);
        updateSalaryStmt.executeUpdate( );
    }
    /* main entry point to the program and start of execution path(s) */
    public static void main(String[ ] args) throws
        java.sql.SQLException {
        Payroll payroll = new Payroll( );
        if (args.length != 1) {
            System.err.println("Parameter <period> is missing.");
        }
        else {
            for (int employeeNumber = 1000; employeeNumber <
1500; employeeNumber++)
            {
```

-continued

```
            /* args[0] will be used as a start parameter */
            payroll.calculateAndUpdateSalary(employeeNumber,
args[0]);
        }
      }
    }
}
```

Figure 3D:
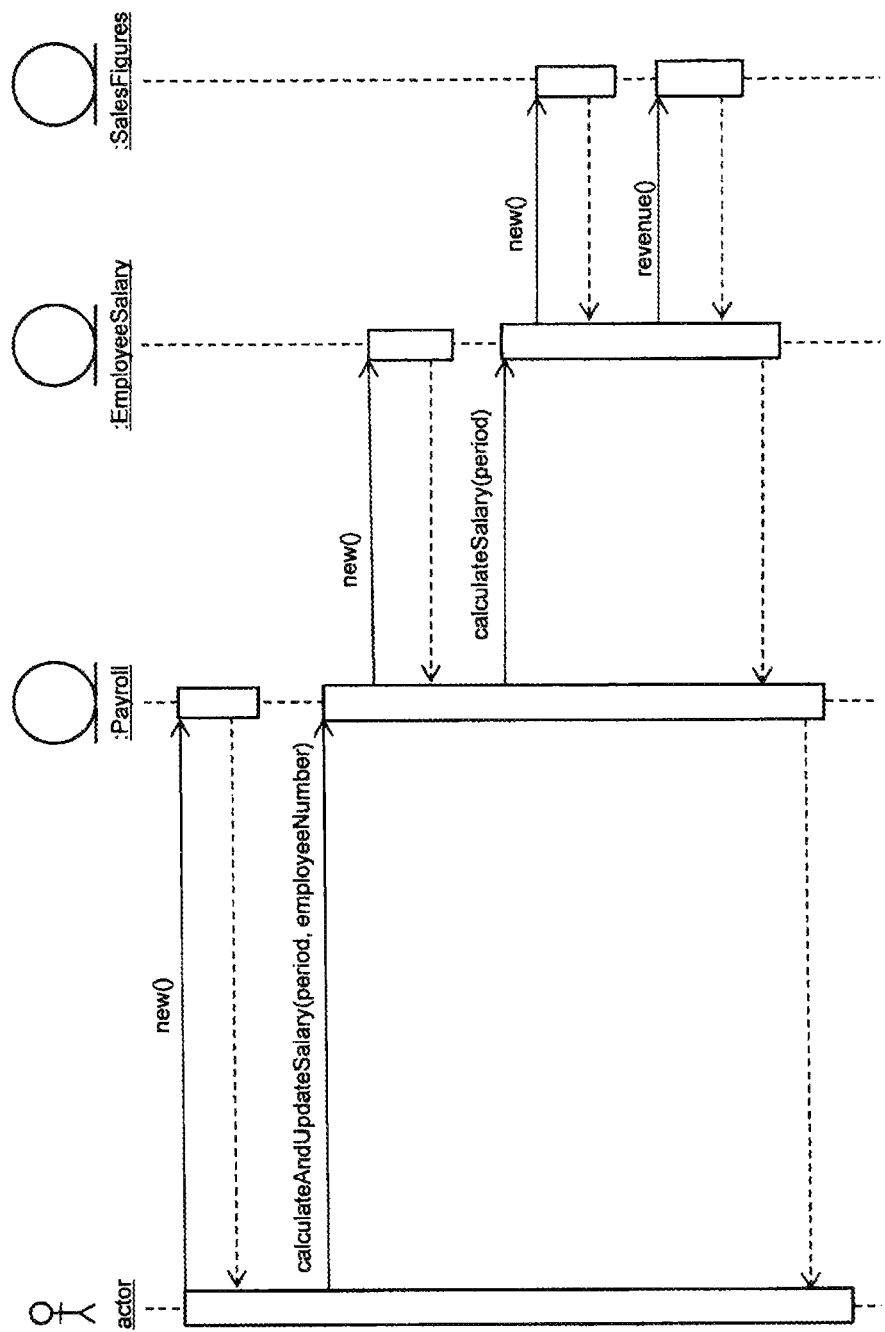
FIG. 3D is a flow diagram of behavior of the exemplary program shown in FIG. 3C at runtime.

Given an employee number and evaluation period the above sample program calculates the salary of the employee with having the employee number and stores the result of the calculation in a salary table. The execution flow during runtime of the sample program shown in FIG. 3C is schematically shown in FIG. 3D.

The program employs three classes: Payroll, SalesFigures, and EmployeeSalary. The class Payroll has a method calculateAndUpdateSalary that calculates the overall salary and stores it in the salary table. The overall salary is the sum of a base salary and a bonus. For managers (wageType=='M'), the bonus is a fraction (10%) of the base salary, while for sales people (wageType=='S'), the bonus is based on sales results for the given period. Sales people are eligible for the bonus if the profit margin of their sales organization exceeds a limit (1000 in the given example). The class EmployeeSalary does the salary calculation while SalesFigures provides indicators for the company's overall profitability within the given period.

Using the disclosed techniques, it may be possible to infer a representative subset of tables (i.e., a subset of the metadata model) and corresponding data required to successfully execute and test the given program, in particular under the following prerequisites:

1. The sample program is comprised of business logic used to retrieve data from a data store.
2. The sample program makes use of a certain data-source (e.g., java.sql.Connection) to access the data store.
3. An execution path can be computed based on the provided business logic and the way it tries to retrieve data.

As a result of source code analysis, the test system may identify or construct a graph representing the flow of control in the program code. Nodes in the graph may be blocks of statements that are executed in sequence and do not contain branches. Branches resulting for example from loops, conditional statements, or subroutine invocations may be represented by links connecting the respective code blocks. Each code block may be annotated with sets of variables, such as value pairs, at the entry and exit of the code block. A value can be a set or a range of values. An entry annotation may list the variables that exist at this position within the source code with all potential values assigned to these variables considering potential paths, e.g., every potential path, within the application. The exit annotations may contain variables and potential values at the exit of the underlying block. If, for example, a block contains an assignment operation A=A+10 and the entry annotation lists potential values 5 and 10 for A, the exit annotation would list the values 15 and 20 instead. In cases where the annotations cannot be determined completely, variable values may remain (partially) unspecified. If those values are used in a dynamic data access operation this may be highlighted, e.g., to a user, as a result of the test data computation to indicate that the corresponding statements may be completed manually.

In the given example, the test system may identify data access operations in the following code units:

1. revenue( ) - SELECT revenue FROM sales WHERE period = "'" + period + "'"
2. sales( ) - SELECT overall_sales FROM sales WHERE period = "'" + period + "'"
3. baseSalary( ) - "SELECT base_salary FROM employees WHERE EMPNO = " + employeeNumber
4. qualifiesForBonus( ) - "SELECT employees.bonus_qualifier FROM employees, sales_by_org " + "WHERE employees.empno = ? AND " + "employees.org = sales_by_org.org AND " + "sales_by_org.profit > 1000"
5. calculcateSalary( ) - SELECT base_salary FROM employees WHERE EMPNO = " + employeeNumber
6. calculateAndUpdateSalary( ) - UPDATE employees SET salary = ? WHERE empno = ?

According to the sample program, the main method invokes calculateAndUpdateSalary( ) invokes calculateSalary( ) and then updates the salary for a given employeeNumber. The entry annotation of this calculation shows that employeeNumber ranges from 1000 to 1499. calculateSalary( ) retrieves the wageType and base salary for a given employee number. Depending on the wage type it may follow one of the following three execution paths to compute the salary for a given employee:

Execution path (A): Regular Employees—base salary is returned

Execution path (B): Managers—base salary+10% bonus is returned

Execution path (C1): Sales Staff—base salary is returned

Execution path (C2): Sales Staff—if the bonus qualifier for this employee is 1a and her/his sales organization has as a profit>1000 base salary+0.1% of the sales revenue is returned As a result of the analysis, the following groups of test data may be identified to ensure coverage of all potential paths through the source code of the business application:

Group1: Regular Employees (not Managers; not Sales Staff)

Group2: Managers (not Sales Staff)

Group3: Sales Staff with bonus qualifier< >1A

Group4: Sales Staff with bonus qualifier=1A from an organization with <=1000 profit Group5: Sales Staff with bonus qualifier< >1A from an organization with >1000 profit The test system may generate data access operations to retrieve a set of employee numbers in the range of 1000-1499 that match the requirements for each of these groups. The number of group members to be retrieved might be a parameter that can be specified when preparing a test run.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may generally be referred to herein as a "circuit," "module" or "system." Furthermore, aspects of the present disclosure may take the form of a computer program product embodied in one or more computer readable media having embodied computer readable program code.

Various combination of one or more computer readable media may be utilized. A computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or a suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or a suitable combination of the foregoing. In the context of this document, a computer readable storage medium may be a tangible medium that can contain, or store a program for use by or in connection with an instruction execution system, apparatus, or device.

A computer readable signal medium may include a propagated data signal with an embodied computer readable program code, for example, in baseband or as part of a carrier wave. Such a propagated signal may take a variety of forms, including, but not limited to, electro-magnetic, optical, or a suitable combination thereof. A computer readable signal medium may be a computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or a suitable combination of these.

Computer program code for carrying out operations for aspects of the present disclosure may be written in various combinations of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, in which a remote computer is involved, the remote computer may be connected to the user's computer through a network, such as a local area network (LAN) or a wide area network (WAN), or the connection may be made to an external computer (for example, through the Internet using an Internet Service Provider).

Aspects of the present disclosure are described with reference to flowchart illustrations and block diagrams of methods, apparatus (systems) and computer program products according to embodiments of the present disclosure. It will be understood that each block of the flowchart illustrations and block diagrams, and combinations of blocks in the flowchart illustrations and block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the functions specified in the flowchart and block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions specified in the flowchart and block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code that comprises one or more executable instructions for implementing the specified logical function(s). It should also be noted that, in some alternative implementations, the functions discussed above may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and "comprising," when used in this specification, specify the presence of stated features, integers, steps, operations, elements, or components, but do not preclude the presence or addition of one or more other features, integers, steps, operations, elements, components, or groups thereof. In the present disclosure, the verb "may" is used to designate optionality or noncompulsoriness. In other words, something that "may" can, but need not.

In the present disclosure, the term "receiving" may comprise obtaining the respective element or information, such as from a storage medium, via a computer network or by user input. In the present disclosure, "receiving" may be accompanied by a "storing" of the received element or information, e.g., in a computer memory, on a hard disk, in a flash storage device or in another storage device. In other words, where a method comprises receiving an element or information, the method may also comprise storing the received element or information.

Similarly, in the present disclosure "establishing" may be accompanied by "storing" of the established element or information, e.g., in a computer memory, on a hard disk, in a flash storage device or in another storage device. In other words, where the method comprises establishing data or information, the method may also comprise storing the established data or information.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limiting. Many modifications and variations will be apparent to those of ordinary skill in the art without departing from the scope and spirit of the disclosure. The embodiments described were chosen to best explain the principles of the disclosure and the practical applications, and to enable others of ordinary skill in the art to understand the various embodiments, which may include various modifications suited to the particular use contemplated or other suitable uses.

What is claimed is:

1. A computer-implemented data selection method comprising:

receiving first data representative of program code comprising a plurality of database operations to be performed on a database;

generating, by a computer processor, second data representative of a sequence of operations encounterable in an execution of the program code, the sequence of operations comprising at least one of the database operations;

determining a set of operands operated on by the sequence of operations encounterable in the execution of the program code;

selecting third data from the database, wherein the third data comprises a randomly selected subset of the set of operands operated on by the sequence of operations encounterable in the execution of the program code;

executing the sequence of operations using the selected third data as an operand for the at least one of the database operations;

establishing an entry point into said program code;

generating fourth data representative of each sequence of operations encounterable in the execution of said program code starting from said entry point;

wherein generating said second data comprises selecting said second data from said fourth data;

establishing, for a parameter used in an operation belonging to a first sequence of operations represented by said fourth data, a value of said parameter at said entry point; and establishing, using said value, a collection of values of said parameter encounterable in an execution of at least one of said first sequence of operations represented by said fourth data to which said operation belongs;

wherein selecting said third data uses said collection of values.

2. The method of claim 1, further comprising:

receiving fifth data representative of at least one of a structure of data of said database and a relationship between data of said database;

wherein selecting said third data uses said fifth data.

3. The method of claim 1, further comprising:

executing said sequence of operations using no more data of said database as an operand for said at least one of said database operations than said selected third data.

4. A data selection system comprising:

a data receiver configured to receive first data representative of program code comprising a plurality of database operations to be performed on a database;

a data generator configured to generate, by a computer processor of the data selection system, second data representative of a sequence of operations encounterable in an execution of the program code, the sequence of operations comprising at least one of the database operations;

a data selector configured to determine a set of operands operated on by the sequence of operations encounterable in the execution of the program code, and to select third data from the database, wherein the third data comprises a randomly selected subset of the set of operands operated on by the sequence of operations encounterable in the execution of the program code;

an operation sequence executor configured to execute the sequence of operations using the selected third data as an operand for the at least one of the database operations;

an entry point establisher configured to establish an entry point into said program code;

wherein said data generator generates fourth data representative of each sequence of operations encounterable in execution of said program code starting from said entry point;

wherein said generating of second data comprises selecting said second data from said fourth data;

a value establisher configured to establish, for a parameter used in an operation belonging to a first sequence of operations represented by said fourth data, a value of said parameter at said entry point; and a collection establisher configured to establish, using said value, a collection of values of said parameter encounterable in an execution of at least one of said first sequence of operations represented by said fourth data to which said operation belongs;

wherein said data selector uses said collection of values for said selection of third data.

5. The system of claim 4, wherein:

said data receiver receives fifth data representative of at least one of a structure of data of said database and a relationship between data of said database; and said data selector uses said fifth data for said selection of third data.

6. The system of claim 4, further comprising:

an operation sequence executor configured to execute said sequence of operations using no more data of said database as an operand for said at least one of said database operations than said selected third data.

7. A computer program product comprising a non-transitory computer readable storage medium having computer readable program code embodied thereon, the computer readable program code executable by a processor to perform a method comprising:

receiving first data representative of program code comprising a plurality of database operations to be performed on a database;

generating second data representative of a sequence of operations encounterable in an execution of the program code, the sequence of operations comprising at least one of the database operations;

determining a set of operands operated on by the sequence of operations encounterable in the execution of the program code;

selecting third data from the database, wherein the third data comprises a randomly selected subset of the set of operands operated on by the sequence of operations encounterable in the execution of the program code;

executing the sequence of operations using the selected third data as an operand for the at least one of the database operations;

establishing an entry point into said program code;

generating fourth data representative of each sequence of operations encounterable in the execution of said program code starting from said entry point;

wherein generating said second data comprises selecting said second data from said fourth data;

establishing, for a parameter used in an operation belonging to a first sequence of operations represented by said fourth data, a value of said parameter at said entry point; and establishing, using said value, a collection of values of said parameter encounterable in an execution of at least one of said first sequence of operations represented by said fourth data to which said operation belongs;

wherein selecting said third data uses said collection of values.

8. The computer program product of claim 7, the method further comprising:

executing said sequence of operations using no more data of said database as an operand for said at least one of said database operations than said selected third data.

9. The computer program product of claim 7, the method further comprising:

receiving fifth data representative of at least one of a structure of data of said database and a relationship between data of said database;

wherein selecting said third data uses said fifth data.

* * * * *